(No Model.) 4 Sheets—Sheet 3.
H. ARON.
APPARATUS FOR MEASURING ELECTRIC CURRENTS.
No. 374,861. Patented Dec. 13, 1887.
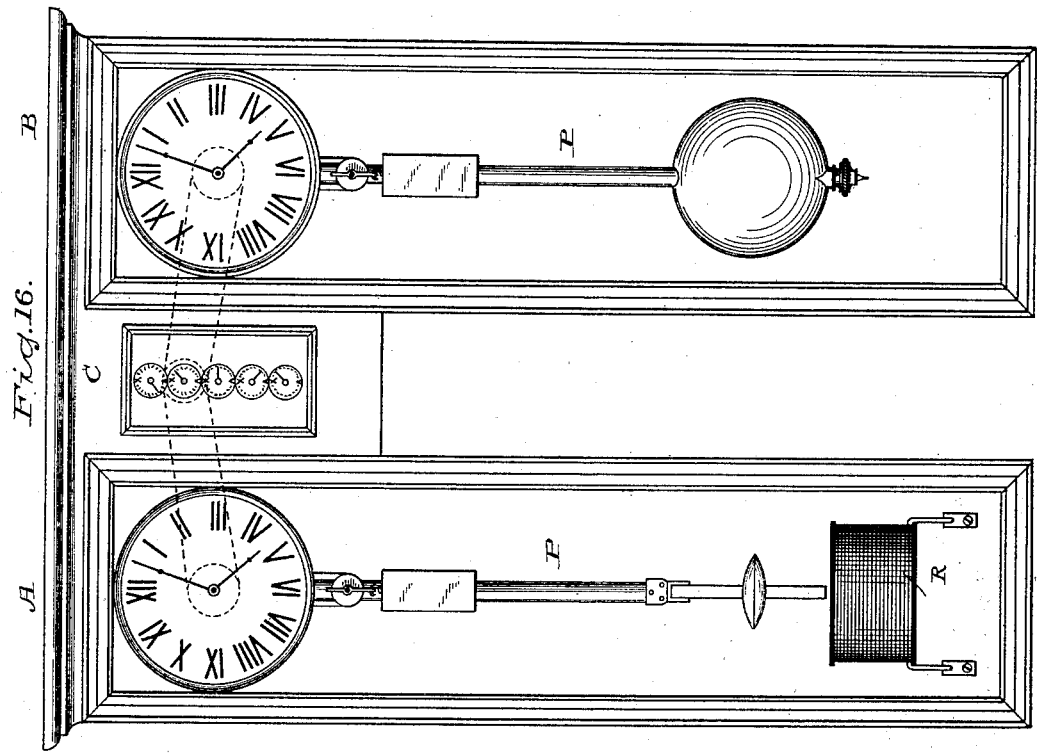
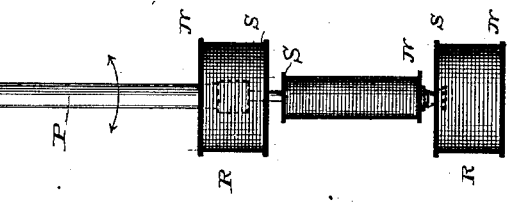
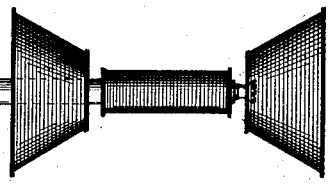
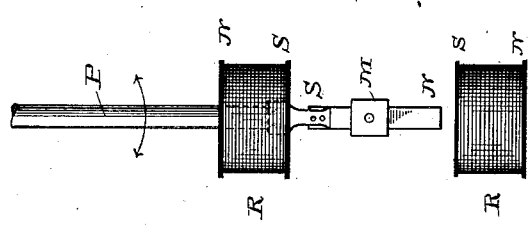
Witnesses
H. A. Lamb
Alp. Scott
Inventor
Hermann Aron
By his Attorney
Frankland Jannus (No Model.) 4 Sheets—Sheet 4.

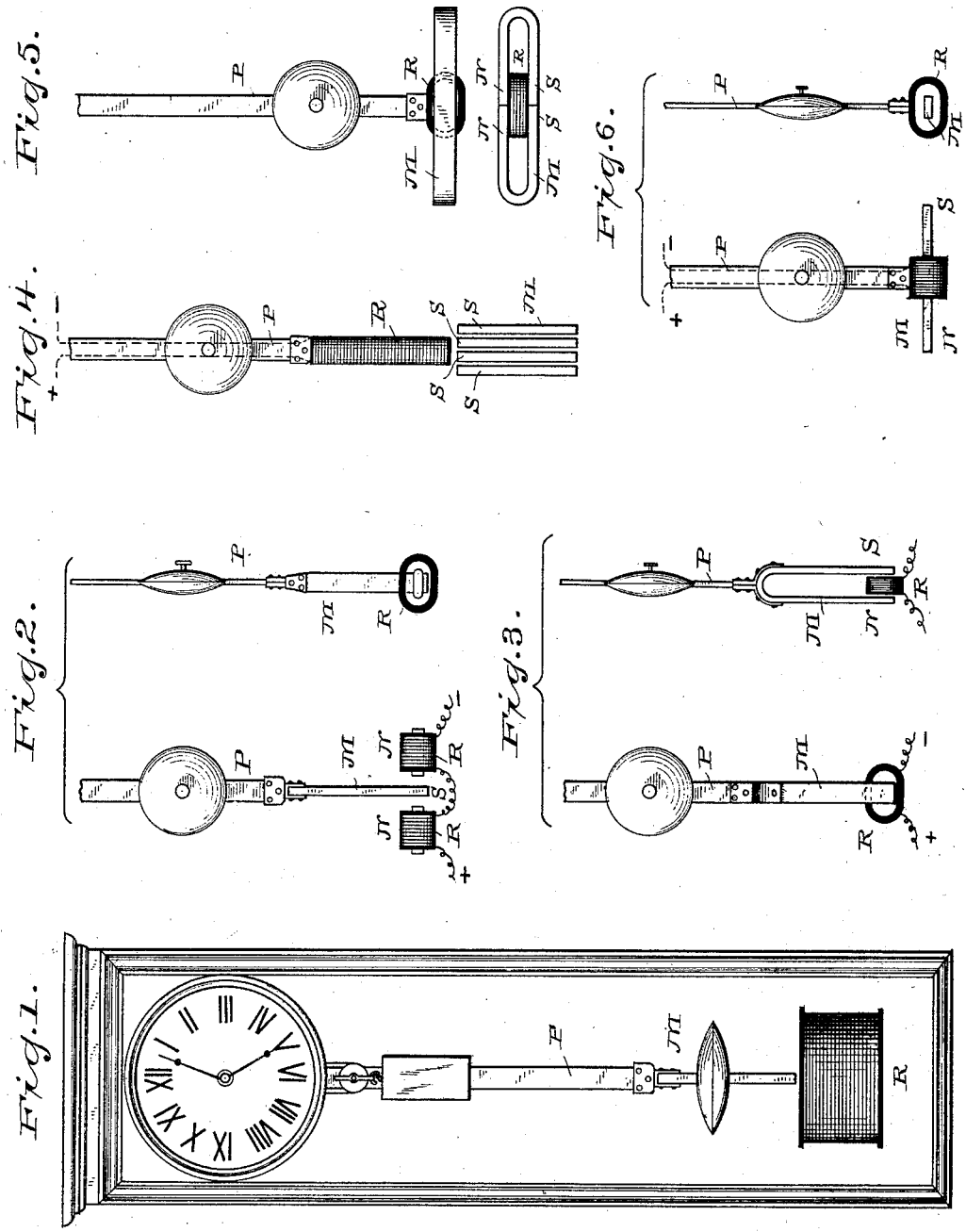

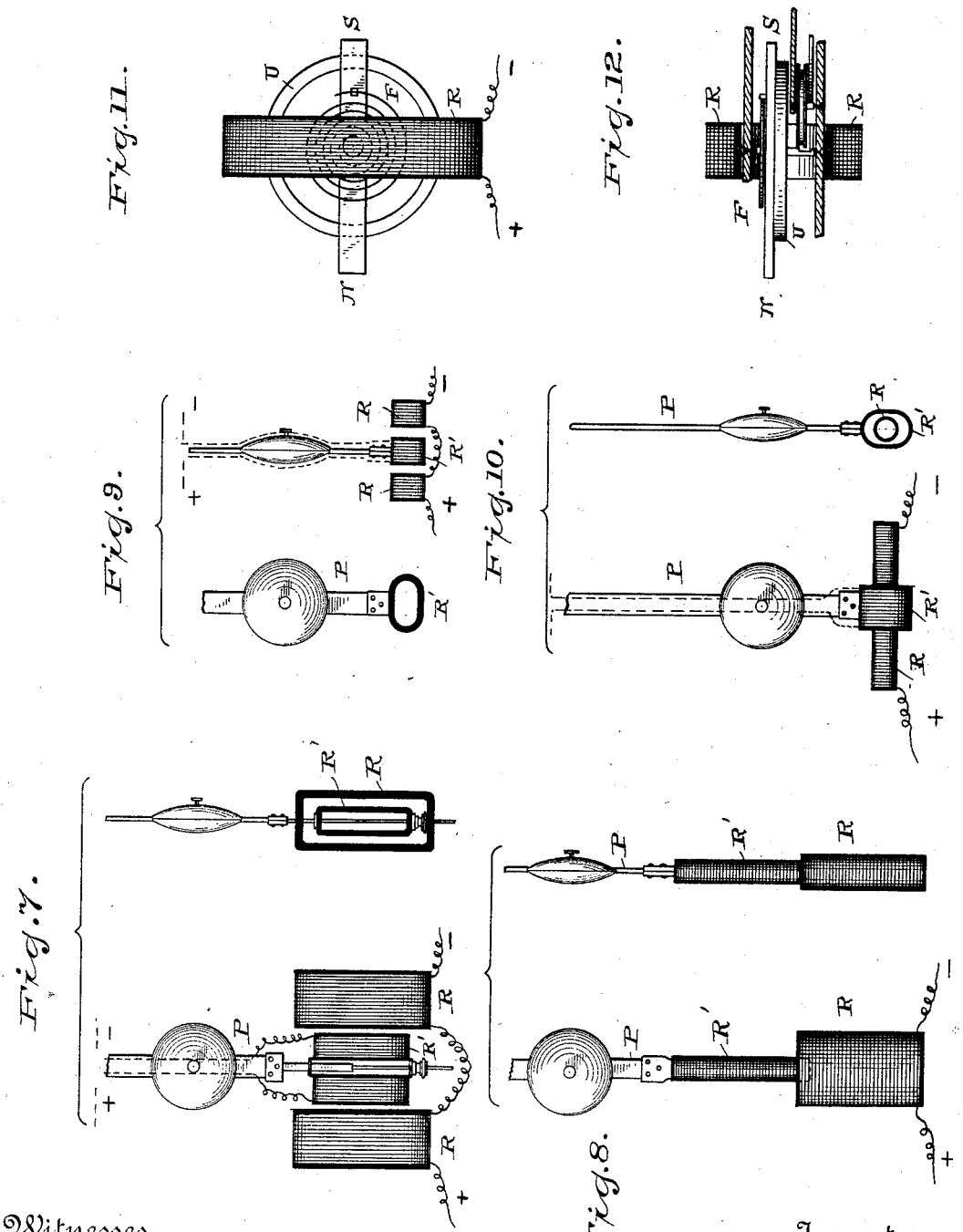

H. ARON.
APPARATUS FOR MEASURING ELECTRIC CURRENTS.

No. 374,861. Patented Dec. 13, 1887.

Witnesses
H. A. Lamb,
Alx. Scott

Inventor
Hermann Aron
By his Attorney
Frankland Jannus

UNITED STATES PATENT OFFICE.

HERMANN ARON, OF BERLIN, GERMANY.

APPARATUS FOR MEASURING ELECTRIC CURRENTS.

SPECIFICATION forming part of Letters Patent No. 374,861, dated December 13, 1887.

Application filed October 1, 1887. Serial No. 251,269. (No model.) Patented in Belgium April 22, 1884, No. 64,893; in France April 22, 1884, No. 161,663; in England April 24, 1884, No. 6,770; in Germany June 15, 1884, No. 30,207; in Italy December 31, 1884, No. 17,469/418, and in Austria-Hungary August 18, 1885, No. 21,403.

*To all whom it may concern:*

Be it known that I, HERMANN ARON, doctor of philosophy, a subject of the King of Prussia, residing at Berlin, in the Kingdom of Prussia, German Empire, have invented certain new and useful Improvements in Apparatus for Measuring Electric Currents, (for which I have obtained a patent in Belgium, No. 64,893, dated April 22, 1884; in France, No. 161,663, dated April 22, 1884; in Great Britain, No. 6,770, dated April 24, 1884; in the German Empire, No. 30,207, dated June 15, 1884; in Italy, No. 17,469/418, dated December 31, 1884, and in Austria-Hungary No. 21,403, dated August 18, 1885,) of which the following is a specification.

My invention relates to a new means for measuring electric currents, which may be better understood if I refer to the known coulomb-meters and volt-coulomb or watt meters, the former of which serves to measure the quantity of electricity ($\int_{T}^{t} I\, dt$) within a given space of time, the latter indicating the amount of electrical energy ($\int_{T}^{t} I\, E\, dt$) within a given time.

My new mode or system has for its object to obtain the results of both systems referred to in the most simple and most reliable manner. It is based upon the influence of the electric current upon the motion of clock-work; but the said influence is only intended to effect a regulating action and not a driving action, as in the case of electric clocks.

The appliances of my invention are independent of the driving mechanism of the clock-work, and the driving-power may be exercised by weights or springs or by electricity. The electrical influence may conveniently be made to act upon the oscillations of the pendulum; but with clocks which are operated by spring-power, or any other driving mechanism, the said influence may with equal advantage be made to act upon the balance or any other regulating device of the clock.

Figure 19:
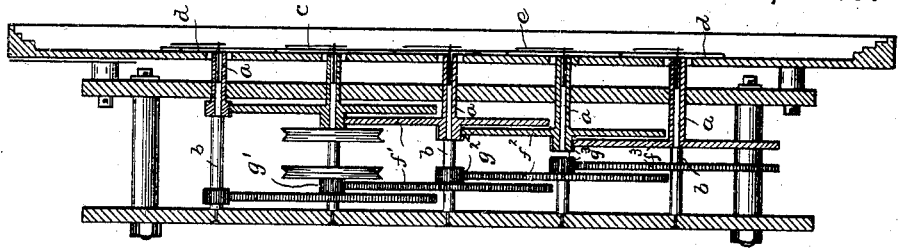
Figure 18:
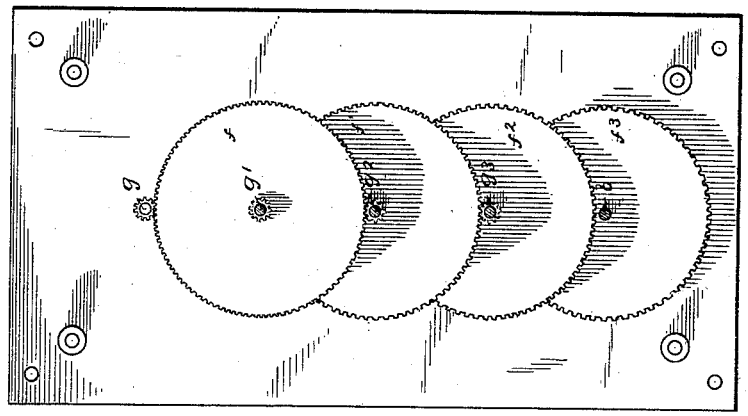
Figure 17:
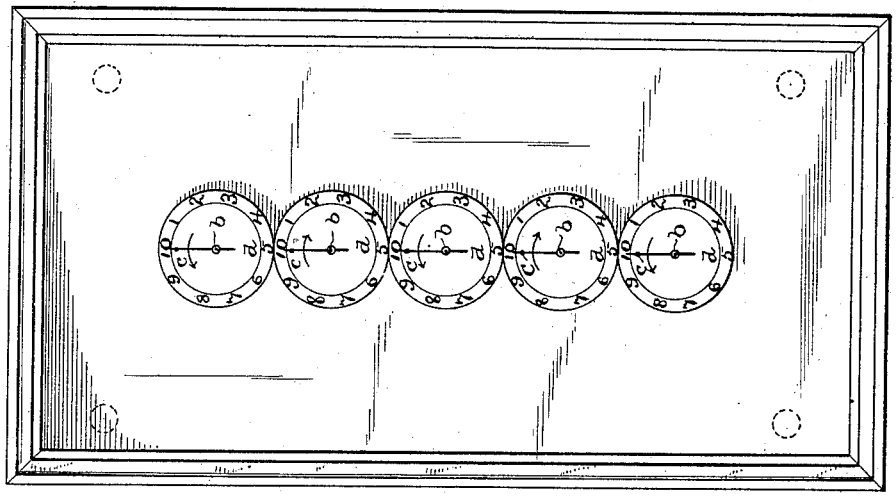

In the accompanying drawings, illustrating my invention, Figure 1 is a view in elevation showing a clock provided with electro-magnetic retarding and accelerating devices embodying my invention. Figs. 2, 3, 4, 5, and 6 are detail views, each showing the lower portion of a clock-pendulum provided with a magnetic device and a stationary electro or permanent magnet under the influence of which the pendulums swing, the said figures embodying the invention shown in Fig. 1, but in somewhat different forms. Figs. 7, 8, 9, and 10 are also detail views, each showing the lower portion of a clock-pendulum, the pendulums in these figures being provided with different forms of electro-magnetic devices moving under the influence of stationary electro-magnets of varying form. Fig. 11 is a view in elevation showing parts of the escapement of a clock employing a balance-wheel in place of the pendulum. Fig. 12 is a plan view of a clock-escapement. Figs. 13, 14, and 15 are detail views, each showing the lower portion of a clock-pendulum, the arrangement shown in the respective figures embodying additional different forms of the invention. Fig. 16 is a view in elevation showing a normal clock, a second clock operating under the influence of the current to be measured, and a registering device by which the deviations in the speed of the second clock are indicated. Fig. 17 is a front elevation of the differential counter. Fig. 18 is a view in elevation, showing one portion of the wheel-work thereof. Fig. 19 is an end elevation of the interior of the register or counting device shown between the two clocks in Fig. 16.

Similar letters denote like parts throughout.

With reference to the drawings, Fig. 1 is a clock, to the pendulum P of which a magnet, M, is secured, swinging above an electric coil, R', through which the current is sent. The magnetic action of the coil upon the magnet will either increase or reduce the natural attraction of the earth on the pendulum, the said action being either an attractive or a repulsive one. In consequence, the electro-magnetic influence exercised by the coil upon the pendulum will either accelerate or retard the oscillations, and thereby the motions, of the clock-work. The dial accordingly will show a time fast or slow compared with that of a normal clock. Such deviations of the clock, influenced by the electric current from the true motion of a normal clock, afford the scale for measuring the influences by which said deviation has been occasioned; and in case of the magnetic influence being small compared with the gravitation of the pendulum, the deviation will be in proportion to the time within which the magnetic influence has been working, as also in due proportion to the intensity of the current, and accordingly the arrangement will constitute a coulomb-meter.

Instead of applying the electro-magnetic influence to one clock only, and of comparing the deviations of that clock with the time of a normal clock, I may employ two clocks influenced by the same current, one of which clocks is thereby made to run as much fast as the other is running slow, the difference between the indications of the two dials affording a scale for measuring the quantity of electricity supplied, each of these clocks consuming only one-half of the magnetic influence. This mode of counting will afford even a greater proportionality to the quantity of electricity to be measured.

In order to obtain a magnetic action approximately as constant during the period of one oscillation as the gravitation, the coil may be shaped oblong in the direction of the oscillation. The magnet may also be arranged to enter more or less into the coil, swinging within instead of above the same.

The coils R R may as well be arranged at both sides of the swinging magnet M, as shown in Fig. 2. The shunt of the two coils R R is so arranged that both coils are acting on the magnet M with the same influence or with the same pole. In case of this simultaneous action being a repulsive one, the motion will be accelerated, and if both coils attract the magnet its motion will be retarded.

Instead of the magnetic bar, shown in Figs. 1 and 2, a horseshoe-magnet, M, as shown in Fig. 3, may be employed, the coil R being arranged between the legs of the magnet.

The same effect will be obtained if, instead of securing the magnet M to the pendulum and making it swing in proximity to a stationary coil, the coil R be secured to the pendulum and swing in proximity to a stationary magnet. Several arrangements of this kind are illustrated by Figs. 4, 5, and 6.

In the modification shown in Fig. 4 the coil R, secured to the pendulum P of the clock, swings above the series of magnetic bars M. In the modification of Fig. 5 the coil R swings within the branches of two horseshoe-magnets, arranged with their poles against each other. In the modification shown in Fig. 6 the stationary magnetic bar M is arranged inside the swinging coil R. If the poles of the permanent magnet in these modifications of Figs. 4, 5, and 6 are arranged toward the poles of the swinging coil, as indicated in the drawings, the motion of the pendulum will always be either accelerated or retarded, and if the direction of the current is reversed the opposite action will be obtained.

In all the arrangements described and shown in Figs. 1 to 6, the permanent magnet M (either stationary or swinging) may be replaced by electro-dynamic coils R', through which the current is sent. The purpose of this modification is to render impossible any false indications which might be occasioned by exterior magnetic influences. The ampère-coil is not, or not so easily, subject to such exterior influences, particularly not when the circuit is interrupted; but even when the current is passing through the coil the exterior influence is of much smaller avail than with the magnet. Such disturbing influence will be the less remarkable if, as it is preferable, the ampère-coil is inclosed in a circuit of little intensity branched off from the main current. The modifications resulting from this exchange are clearly shown in Figs. 7, 8, 9, and 10. If, with the application of such coils, I arrange the shunt in a manner that the electro-dynamic action of one coil indicates the volts while the other indicates the ampères, I thereby obtain a volt-coulomb or watt meter.

An essential feature of my invention, as shown in Figs. 1 to 10, is to arrange the stationary coil or coils or the stationary magnet with relation to the swinging magnet or the swinging coil or coils in such a manner that the magnetic influence is active in the plane of oscillation of the pendulum and the parts attached thereto. I thereby avoid the pendulum being forced out of its normal path and assuming an elliptic oscillation, which would greatly impair the preciseness of the indications of the dial. In all the Figs. 1 to 10 the arrangement of the magnet with relation to the coil or coils, or of the stationary coil or coils with relation to the swinging coil or coils, is symmetrical to the plane of oscillation.

For the volt-coulomb meter I prefer the arrangement shown in Fig. 7, in which the stationary coils R are arranged with their working surfaces vertically on the plane of oscillation of the swinging coils R'. The coils R may conveniently be placed in such proximity to the coils R' that the latter, while swinging, enter into the cavity of the coils R. I thereby obtain a considerable amount of action, exercised precisely in the plane of oscillation, and a great momentum compared with that of gravitation.

In the modification Fig. 8 the swinging coil R' enters with its lower end into the cavity of the oblong stationary coil R; but it might be arranged to swing above the same.

In Fig. 9 the coil R', secured to the pendulum P of the clock, swings between the coils R arranged at both sides, and in Fig. 10 the stationary coil R is arranged inside the swinging coil R'.

In the modifications shown in Figs. 7 and 9 the shunt is so arranged that both of the two stationary coils R act on the swinging coil or coils R' with the same effect, either repulsive or attractive. The pendulum thus repulsed or attracted simultaneously on both sides accordingly will be either accelerated or retarded.

In the modifications shown in Figs. 8 and 10 the pendulum will always be either accelerated or retarded independently of the shunt. The opposite effect will be obtained by reversing the direction of the current of one of the coils R or R'.

The sensibility of any of these instruments may further be regulated according to any actual requirements by well-known means.

In those cases where it is preferred to obtain a considerable amount of action rather than great accuracy, the bobbins in all arrangements may be provided with iron cores to increase their effect. Such iron cores may particularly and with good result be employed in the volt-coil of the volt-coulomb or watt meter, if said volt-coil is stationary and the ampère-coil secured to the pendulum and inclosed in a branched-off circuit. The purpose of this arrangement is, first, to increase the amount of action which otherwise would be very small, and, further, to increase the proportionality, which in this case may be obtained if the electro-magnetic influence works an acceleration of the clock-work.

Where the magnetic influence of the current is made to work upon a clock with spring and balance, instead of upon a pendulum, the varying magnetic influence will impair the constant elasticity of the spring, and thereby effect the deviations to be read on the dial. An arrangement of this kind is shown in Figs. 11 and 12. To the balance U of the clock, which carries the spring F, a magnet, N S, is secured, surrounded by a coil, R, through which the current is sent. In this, as in other arrangements, the magnet secured to the balance may be replaced by small electric coils, through which the current is sent and upon which a stationary magnet or stationary electro-dynamic coils exert an influence, which either increases or decreases the elastic momentum of the spring, thereby effecting the deviations from the normal motion of the clock, such deviations serving, as already described with reference to the pendulum-clock, to measure the electricity. In some cases it may be found sufficient to omit the magnet N S, secured to the balance U of the clock, and to employ in its stead the hair-spring F, magnetized in the direction N S of Fig. 11. The electric current, exerting its magnetic influence directly upon the said spring, will influence its elasticity in a similar manner as with the magnet, and the effect will be essentially the same. All the modifications described with reference to the pendulum may be applied to the spring-regulator of clock-work without materially changing the arrangements.

In Fig. 12 I have shown the magnet and coil arranged in combination with a cylinder-escapement; but the same arrangement may be combined without difficulty with an anchor-escapement, or any other similar device.

To increase the amount of action between the stationary coils and the magnet or coil attached to the swinging pendulum I have further constructed the modifications shown in Figs. 13, 14, and 15. They consist in placing two stationary coils, R, one below the swinging magnet M or coil R', the other above the same, the pendulum passing through the interior of the upper coil. The poles of these two coils R are so arranged with relation to the poles of the swinging magnet M or coil R' that while the lower coil R attracts the lower end of the magnet M or coil R' the upper coil R acts repulsively on the upper end, or vice versa. The stationary coils R shown in Fig. 15 are of a tapering shape. The total amount of action will be increased if both poles of the swinging magnet or coil attached to the pendulum P are influenced in the manner described.

The effect exerted by the influence of the current on the normal motion of clock-work, as hereinbefore described, is extremely small. For practical use, however, it will be necessary to obtain deviations of greater amount, and in order to secure the same and to maintain, nevertheless, the due proportionality as far as possible, the instrument ought to be provided with means to correct the excess of action which impairs such proportionality. The coulomb-meter contains in itself such means, afforded by the temporary magnetism of the hardened steel of the magnet, provided the temper of said steel be suitably set; but the volt-coulomb meter does not contain any parts which might acquire such temporary magnetism. In general, the use of iron parts in combination with the pendulum and in reach of the action of the coils is carefully avoided in such instruments, because their indications are known to be impaired by the iron; but I have found that, up to a certain degree, iron parts may be employed, and that they exactly afford the temporary magnetism which, as in the coulomb-meter, serves to correct the indications. I therefore arrange, in combination with the pendulum, without or within the swinging coil or coils, a small portion of iron subject to the magnetizing action of the stationary coil or coils. Accordingly the indications of the instrument, in spite of the variability of the currents, will not, or but very slightly, differ from the quantity to be measured.

Instead of measuring or counting the electricity by comparing the time indicated on the dial of a clock influenced by the current, as described, with the time indicated by a normal clock, the two clocks to be compared may as well be arranged in combination with each other for the purpose of counting or measuring the deviations automatically. An arrangement of this kind is shown in Figs. 16, 17, 18, and 19, Fig. 16 being a front elevation of the instrument, Fig. 17 a front elevation of the differential counter C', and Fig. 18 an end elevation of the same. Fig. 19 is a central vertical cross section of the instrument shown in Fig. 16.

The clock-work A, under the influence of the current by means of the coil R, or provided with any one of the modifications described with reference to Figs. 1 to 15, is mounted upon the same bed-plate or secured within the same frame as the normal clock B. Both clock-works A and B, the dials and fingers of which may be entirely omitted, being of no avail, impart their motions to a differential counter, C, placed between the two clocks A and B. This differential counter C is so constructed that the fingers $c$ and dial-plates $d$ are concentrically turning around the same axis. For this purpose the spindles $a$ of the dials $d$ are hollow, and the spindles of the fingers $c$ guided inside the spindles $a$. One of the clocks A and B imparts motion to the fingers $c$, the other clock to the dials $d$. For this purpose a strap-pulley is mounted upon the axis of the fingers of each of the clock-works A and B, and a strap or cord passes from one of said pulleys to the pulley $e$ on the axis $b$ of the finger $c$. Another strap or cord from the other pulley drives the pulley $e'$ on the axis $a$ of the dial $d$. By this means one of the clocks A and B drives the fingers of the differential counter C, the other clock the dials of the same, both in one direction. It will be easily understood that as long as both clocks are going exactly at the same speed, the fingers and dials of the differential counter C will keep their normal positions toward each other; but as soon as one of the clock-works A and B will be fast or slow the fingers and dials of the differential counter C will also turn at a different speed and the deviation be marked on the dials. Such deviation indicating the amount of electricity supplied, the latter will be automatically shown and summed up by the dials of the intermediate or differential counter, C, the finger-spindles and dial-spindles of which are geared, as shown, by the toothed wheels $f\, f'\, f^2\, f^3$ and gears $g\, g'\, g^2\, g^3$, to indicate the units, tens, hundreds, and so on, as is well known by similar mechanical counting devices.

Instead of combining one electricity-counter of my invention with a normal clock-work, as shown in Fig. 16, two clock-works influenced by the same electric current may be combined and arranged exactly in the same manner, one of these two clock-works being made to go as much fast as the other is made to go slow by the accelerating and retarding action of the current, as described. The differential counter C, receiving the movements of these two clock-works, will in this case indicate the total amount of deviation of both clock-works, and by this means afford even greater proportionality to the quantity to be measured. Either of these combinations may be further modified by omitting the differential counter C between the two clock-works A and B. In its stead one of the dial-plates A or B is used to afford the one system or train of the differential counter, while the other system, concentrically combined with the former, receives its motion by transmission from the other clock-work in the same manner as described with reference to Fig. 16. Also, the normal clock-work B, as shown in Fig. 16, may be replaced by an electric dial-train periodically controlled from a central station, as ordinary dial-trains which serve to replace clocks with movement of their own.

I claim as my invention—

1. In an apparatus for measuring currents of electricity, the combination of a pendulum or balance-wheel of a clock, a magnet attached thereto and moving therewith, and a stationary coil or electro-magnet arranged in the path of said magnet and included in the circuit the current of which is to be measured, substantially as described.

2. In an apparatus for measuring currents of electricity, the combination of a clock-train and gravitating pendulum, a magnet on said pendulum, and stationary coils or electro-magnets through which passes the current to be measured, said coils or magnets being located in the path of the pendulum and arranged to exert an influence thereon proportionate to the current-strength, substantially as described.

3. In an apparatus for measuring currents of electricity, the combination of a clock-train, an electro-magnet or solenoid included in the circuit carrying the current to be measured, a magnet attached to a moving portion of the clock-train and affecting the speed thereof in proportion to the strength of the current to be measured, and a speed-indicating device connected to and operated by the clock-work, substantially as described.

4. In an apparatus for measuring currents of electricity, the combination, with a stationary coil or coils included in an electric circuit, of a clock the pendulum or balance-wheel of which moves under the influence of the coil or coils, whereby the speed thereof is varied in accordance with the flow of current to indicate by comparison with a normal clock the amount of electrical energy passing the retarding-coil in a given period of time, substantially as described.

5. In an apparatus for measuring currents of electricity, the combination, with the pendulum of a clock, of a solenoid or electro-magnet secured to and swinging with the pendulum, and a stationary coil or electro-magnet in the path of the swinging magnet, the stationary and swinging magnets being suitably connected in the circuit and representing, respectively, the voltage and ampère strength of the current to be measured, and acting to accelerate or retard the motion of the clock according to the strength and intensity of the current passing through the coils of the magnets, substantially as described.

6. In an apparatus for measuring electric currents, the combination, with the pendulum of a clock, of a solenoid or electro-magnet secured to and swinging with the pendulum, and a stationary coil or electro-magnet in the path of the swinging magnet, both magnets being vitalized by the current to be measured and acting to accelerate or retard the motion of the clock according to the strength and intensity of the current passing through the coils of the magnets, substantially as described.

7. The combination, with the pendulum of a clock, of an electro-magnet secured to and swinging with the pendulum, and a stationary coil or electro-magnet in the path of the swinging magnet, both magnets being vitalized by the current to be measured and acting to accelerate or retard the motion of the clock according to the strength and intensity of the current passing through the coils of the magnets, and a speed indicating or registering mechanism connected to and actuated by the clock, substantially as described.

8. In an apparatus for measuring currents of electricity, the combination of a clock-train, a magnetic or magnet-carrying pendulum, a stationary magnet in the path of the pendulum and through which the current to be measured passes, and an indicating device connected to and actuated by the clock-train, a second indicating device, and a normal or standard clock for actuating the same, the said second indicator being arranged to register, unaffected by the passage of electric currents, the indicated differences of speed, forming a register of the current used, substantially as described.

In witness whereof I have hereunto signed my name in the presence of two subscribing witnesses.

HERMANN ARON.

Witnesses:
B. ROI,
OTHMAR LENZ.